(12) United States Patent
Hoffman et al.

(10) Patent No.: US 8,474,874 B2
(45) Date of Patent: Jul. 2, 2013

(54) LAYERED IMAGE DISPLAY SHEET

(75) Inventors: Anthony Lynn Hoffman, Eagan, MN (US); John Tomczyk, Shoreview, MN (US); Alain Yves Abdelkader, Flagstaff, AZ (US)

(73) Assignee: Travel Tags, Inc., North Mankato, MN (US)

( * ) Notice: Subject to any disclaimer, the term of this patent is extended or adjusted under 35 U.S.C. 154(b) by 1120 days.

(21) Appl. No.: 11/906,397

(22) Filed: Oct. 2, 2007

(65) Prior Publication Data
US 2008/0088931 A1   Apr. 17, 2008

Related U.S. Application Data

(60) Provisional application No. 60/848,719, filed on Oct. 2, 2006.

(51) Int. Cl.
*B42D 15/00* (2006.01)
*B42D 15/10* (2006.01)

(52) U.S. Cl.
USPC ............. 283/94; 283/67; 283/72; 283/81; 283/86; 283/91; 283/107; 283/108; 283/901

(58) Field of Classification Search
USPC ............. 281/51; 283/67, 72, 81, 86, 91, 94, 283/107, 108, 117, 901
See application file for complete search history.

(56) References Cited

U.S. PATENT DOCUMENTS

| | | | |
|---|---|---|---|
| 3,503,315 A | 3/1970 | de Montebello | |
| 3,725,184 A | 4/1973 | Scopp | |
| 4,414,316 A | 11/1983 | Conley | |
| 4,920,039 A | 4/1990 | Fotland et al. | |
| 4,935,335 A | 6/1990 | Fotland | |
| 5,034,982 A | 7/1991 | Heninger et al. | |
| 5,266,995 A | 11/1993 | Quadricci et al. | |
| 5,285,238 A | 2/1994 | Quadricci et al. | |
| 5,318,807 A | 6/1994 | Gili Picoy | |

(Continued)

FOREIGN PATENT DOCUMENTS

| CN | 2719578 Y | 8/2005 |
|---|---|---|
| FR | 2551559 | 3/1985 |

(Continued)

OTHER PUBLICATIONS

International Search Report of PCT/US07/2114, mailed Mar. 12, 2008 (3 pgs).

(Continued)

*Primary Examiner* — Dana Ross
*Assistant Examiner* — Justin V Lewis
(74) *Attorney, Agent, or Firm* — Patterson Thuente Pedersen, P.A.

(57) ABSTRACT

A moiré pattern display sheet is defined by a surface, with the surface being configured to be curved. A first layer has a pattern printed thereon. The pattern comprises a series of visual elements in a first row that have been distorted at least in a first direction. At least some of the series of visual elements are printed to approximately follow an arc having a sweep angle associated therewith. A light steering optical layer overlays the first layer. The light steering optical layer comprises a plurality of parallel optical features which each have a width and which change the direction of the light and thereby provide a depth effect of the visual elements to a viewer looking through the light steering optical layer.

53 Claims, 12 Drawing Sheets

U.S. PATENT DOCUMENTS

| | | | |
|---|---|---|---|
| 5,321,749 A | 6/1994 | Virga | |
| 5,330,799 A | 7/1994 | Sandor et al. | |
| 5,362,351 A | 11/1994 | Karszes | |
| 5,457,515 A | 10/1995 | Quadracci et al. | |
| 5,460,679 A | 10/1995 | Abdel-Kader | |
| 5,492,578 A | 2/1996 | Morton | |
| 5,554,432 A | 9/1996 | Sandor et al. | |
| 5,642,226 A | 6/1997 | Rosenthal | |
| 5,685,570 A | 11/1997 | Gray et al. | |
| 5,753,344 A | 5/1998 | Jacobsen | |
| 5,762,379 A | 6/1998 | Salmon et al. | |
| 5,772,249 A * | 6/1998 | Guex et al. | 283/72 |
| 5,949,420 A | 9/1999 | Terlutter | |
| 6,113,149 A | 9/2000 | Dukatz | |
| 6,170,881 B1 | 1/2001 | Salmon et al. | |
| 6,251,566 B1 | 6/2001 | Brosh et al. | |
| 6,252,621 B1 | 6/2001 | Kessler et al. | |
| 6,256,150 B1 | 7/2001 | Rosenthal | |
| 6,373,636 B1 | 4/2002 | Conley | |
| 6,424,323 B2 | 7/2002 | Bell et al. | |
| 6,424,467 B1 | 7/2002 | Goggins | |
| 6,490,092 B1 | 12/2002 | Goggins | |
| 6,494,491 B1 * | 12/2002 | Zeiter et al. | 283/91 |
| 6,596,361 B2 | 7/2003 | Klein et al. | |
| 6,624,946 B2 | 9/2003 | Franko, Sr. | |
| 6,751,024 B1 | 6/2004 | Rosenthal | |
| 6,781,761 B2 * | 8/2004 | Raymond | 283/81 |
| 6,784,962 B2 | 8/2004 | Sumida et al. | |
| 6,795,250 B2 | 9/2004 | Johnson et al. | |
| 6,833,960 B1 | 12/2004 | Scarbrough et al. | |
| 6,843,009 B2 | 1/2005 | Kainen | |
| 6,856,462 B1 | 2/2005 | Scarbrough et al. | |
| 6,872,277 B2 | 3/2005 | Klein et al. | |
| 6,900,944 B2 | 5/2005 | Tomczyk | |
| 6,974,080 B1 | 12/2005 | Goggins | |
| 6,989,931 B2 | 1/2006 | Rosenthal | |
| 6,995,913 B2 | 2/2006 | Goggins | |
| 7,001,654 B2 | 2/2006 | Kiraly et al. | |
| 7,002,748 B1 | 2/2006 | Conley et al. | |
| 7,048,307 B1 | 5/2006 | Scarbrough et al. | |
| 7,075,725 B2 | 7/2006 | Tomczyk | |
| 7,083,340 B2 | 8/2006 | Goggins | |
| 7,101,437 B2 | 9/2006 | Boutilier et al. | |
| 7,114,750 B1 | 10/2006 | Alasia et al. | |
| 7,130,126 B1 | 10/2006 | Chung | |
| 7,136,185 B2 | 11/2006 | Goggins | |
| 7,149,035 B2 | 12/2006 | Goggins | |
| 7,164,537 B2 | 1/2007 | Raymond | |
| 7,165,959 B2 | 1/2007 | Humlicek et al. | |
| 7,190,518 B1 | 3/2007 | Kleinberger et al. | |
| 7,212,346 B2 | 5/2007 | Krause | |
| 7,239,420 B2 | 7/2007 | Goggins | |
| 7,242,525 B2 | 7/2007 | Raymond | |
| 7,259,916 B2 | 8/2007 | Raymond | |
| 7,290,802 B1 | 11/2007 | Scarbrough et al. | |
| 7,290,803 B2 | 11/2007 | Scarbrough et al. | |
| 7,304,802 B2 | 12/2007 | Raymond | |
| 7,307,790 B1 | 12/2007 | Raymond et al. | |
| 7,359,120 B1 | 4/2008 | Raymond et al. | |
| 7,414,790 B2 | 8/2008 | Raymond et al. | |
| 7,465,369 B2 | 12/2008 | Raymond | |
| 7,468,842 B2 | 12/2008 | Steenblik et al. | |
| 7,545,565 B2 | 6/2009 | Tomczyk | |
| 7,545,566 B2 | 6/2009 | Tomczyk | |
| 7,545,567 B2 | 6/2009 | Tomczyk | |
| 7,654,579 B2 | 2/2010 | Hansen | |
| 2003/0108198 A1 | 6/2003 | Lahiri | |
| 2004/0095648 A1 | 5/2004 | McCannel et al. | |
| 2004/0115376 A1 | 6/2004 | Tomczyk | |
| 2004/0136079 A1 | 7/2004 | Goggins | |
| 2004/0263885 A1 | 12/2004 | Tomczyk | |
| 2005/0156813 A1 | 7/2005 | Adachi et al. | |
| 2005/0184504 A1 | 8/2005 | Alasia et al. | |
| 2006/0151993 A1 | 7/2006 | Nemeth | |
| 2006/0285215 A1 | 12/2006 | Wu | |
| 2007/0058258 A1 | 3/2007 | Mather et al. | |
| 2007/0132122 A1 | 6/2007 | Raymond et al. | |
| 2007/0188874 A1 | 8/2007 | Robb et al. | |
| 2008/0088126 A1 | 4/2008 | Hoffman et al. | |
| 2008/0088931 A1 | 4/2008 | Hoffman | |
| 2008/0106091 A1 | 5/2008 | Tompkin et al. | |
| 2008/0129038 A1 | 6/2008 | Scarbrough | |
| 2008/0213528 A1 | 9/2008 | Hoffman et al. | |
| 2008/0284157 A1 * | 11/2008 | Muke et al. | 283/86 |
| 2009/0097114 A1 | 4/2009 | Mimura et al. | |
| 2009/0168165 A1 | 7/2009 | Hoffman | |
| 2009/0251787 A1 | 10/2009 | Tomczyk | |
| 2009/0315321 A1 | 12/2009 | Michieli et al. | |
| 2010/0015403 A1 | 1/2010 | Sacks et al. | |
| 2010/0018644 A1 | 1/2010 | Sacks et al. | |
| 2010/0134895 A1 | 6/2010 | Hoffman et al. | |
| 2010/0182666 A1 | 7/2010 | Herbert et al. | |

FOREIGN PATENT DOCUMENTS

| | | |
|---|---|---|
| FR | 2551560 | 3/1985 |
| WO | WO 97/03826 | 2/1997 |
| WO | WO 2004/021069 | 3/2004 |
| WO | WO 2006/029745 | 3/2006 |
| WO | WO 2008/042348 A1 | 4/2008 |
| WO | WO 2008/042349 A2 | 4/2008 |
| WO | WO 2008/079268 A2 | 7/2008 |

OTHER PUBLICATIONS

International Search Report of PCT/US07/2005, mailed Mar. 13, 2008 (3 pgs).

Search Report dated Jun. 5, 2008 for PCT Application No. PCT/US2007/026012 filed Dec. 19, 2007, 3 pages.

Search Report dated Mar. 12, 2008 for PCT Application No. PCT/US2007/21114 filed Oct. 2, 2007, 3 pages.

Search Report dated Mar. 13, 2008 for PCT Application No. PCT/US2007/21115 filed Oct. 2, 2007, 3 pages.

Application and File history for U.S. Appl. No. 11/906,398, filed Oct. 2, 2007. Inventors: Anthony L. Hoffman et al.

Application and File history for U.S. Appl. No. 12/004,097, filed Dec. 19, 2009. Inventors: Anthony L. Hoffman et al.

Search Report dated Apr. 30, 2010 for PCT Application No. PCT/US2009/057529 filed Sep. 18, 2009, 11 pages.

Application and File history for U.S. Appl. No. 12/562,795, filed Sep. 18, 2009. Inventors: Hoffman et al.

Web page entitled "3D Lenticular and Hologravure Packaging" by 3DZ. Web archive Jun. 21, 2006 http://web.archive.org/web/20060621035150/http://www.3dz.co.uk/packaging.html.

Amendment filed Nov. 30, 2010 in response to Office Action dated Jun. 30, 2010 for U.S. Appl. No. 11/906,398, filed Oct. 2, 2007, 21 pages.

Amendment filed Dec. 2, 2010 in response to Office Action dated Aug. 2, 2010 for U.S. Appl. No. 12/004,097, filed Dec. 19, 2007, 20 pages.

Final Office Action dated Feb. 14, 2011 for U.S. Appl. No. 12/004,097, filed Dec. 19, 2007, 20 pages.

Office Action dated Mar. 1, 2011 for U.S. Appl. No. 11/906,398, filed Oct. 2, 2007, 46 pages.

Amendment filed Jun. 1, 2011 for U.S. Appl. No. 11/906,398, filed Oct. 2, 2007, 20 pages.

Brochure, "3-D Images", known to applicant at least as of May 11, 2011, 8 pages.

* cited by examiner

LAYERED IMAGE DISPLAY SHEET

This application claims the benefit of U.S. Provisional Application Ser. No. 60/848,719 filed on Oct. 2, 2006, entitled "LAYERED IMAGE DISPLAY SHEET," which application is incorporated herein by reference in its entirety.

BACKGROUND

The invention generally relates to applications and techniques of moiré pattern display sheets which create a visual layered image effect and which may be used as labeling for containers or other uses.

It is conventionally known to create display sheets which may be used for labeling, decoration, advertising, etc. that provide a visual effect of depth. The visual effect provides a pattern which appears to be in back of another image in the foreground. This depth effect may also be referred to as a layered image effect. Such a layered image effect may be produced by using a series of images that are distorted in one direction (e.g. distorted in the width). The effect is created by overlaying a lenticular display screen which steers light thereby producing the depth effect of the series of images. A foreground image may interrupt and overlay the series of images. The foreground image may be a plain image, an interlaced image, or other types of images.

This technique may be referred to as the creation of moiré patterns which is an interferometric effect.

Often it is desirable to use the display sheets as labels for containers or as advertising. However, when a visual display sheet that has the layered depth effect is curved and/or curved around a non-cylindrical object, an undesirable look may occur. The undesirable look may be a slant of a row of images forming a pattern or a distortion of the expected pattern. Accordingly, there is a need for techniques in which moiré patterns may be generated and applied to curved surfaces and to products having curved surfaces.

The techniques herein below extend to those embodiments which fall within the scope of the appended claims, regardless of whether they accomplish one or more of the above-mentioned needs.

SUMMARY

What is provided is a moiré pattern display sheet defined by a surface, with the surface being configured to be curved. The display sheet comprises a first layer having a pattern printed thereon. The pattern comprises a series of visual elements in a first row that have been distorted at least in a first direction. At least some of the series of visual elements are printed to follow an arc having a sweep angle associated therewith. At least some of the series of visual elements are rotated relative to one another along the arc. A light steering optical layer overlays the first layer. The light steering optical layer comprises a plurality of optical features which each have a width and which change the direction of the light and thereby provide a depth effect of the visual elements to a viewer looking through the light steering optical layer.

What is also provided is a method of forming a moiré pattern display sheet defined by a surface, with the surface being configured to be curved. The method comprises printing a first layer with a pattern. The pattern comprises a series of visual elements in a first row that have been distorted at least in a first direction. At least some of the series of visual elements are printed to follow an arc having a sweep angle associated therewith. At least some of the series of visual elements are rotated relative to one another along the arc. The method also comprises providing a light steering optical layer that overlays the first layer. The light steering optical layer comprises a plurality of parallel optical features which each have a width and which change the direction of the light and thereby provide a depth effect of the visual elements to a viewer looking through the light steering optical layer.

Further, what is provided is a moiré pattern display sheet defined by a surface, with the surface being configured to be curved. The display sheet comprises a first layer having a pattern printed thereon. The pattern is divided into at least a first and second region. The pattern comprises a series of visual elements in a first region that have been distorted at least in a first direction. The series of visual elements of the first region are spaced apart by a first spacing and each of the series of visual elements of the first region have a first width. The series of visual elements of the second region are at least one of spaced apart by a second spacing different than the first spacing or the series of visual elements have a second width different than the first width. The display sheet also comprises a light steering optical layer overlaying the first layer. The light steering optical layer comprising a plurality of parallel optical features which each have an optical element width and which change the direction of the light and thereby provide a depth effect of the visual elements to a viewer looking through the light steering optical layer.

Further still what is provided is a method of forming a moiré pattern display sheet defined by a surface, with the surface being configured to be curved. The method comprises printing a first layer having a pattern printed thereon. The pattern is divided into at least a first and second region. The pattern comprises a series of visual elements in a first row that have been distorted at least in a first direction. The series of visual elements of the first region are spaced apart by a first spacing and each of the series of visual elements of the first region have a first width. The series of visual elements of the second region are at least one of spaced apart by a second spacing different than the first spacing or the series of visual elements have a second width different than the first width. The method also comprises providing a light steering optical layer overlaying the first layer. The light steering optical layer comprises a plurality of parallel optical features which each have an optical element width and which change the direction of the light and thereby provide a depth effect of the visual elements to a viewer looking through the light steering optical layer.

Alternative exemplary embodiments relate to other features and combinations of features as may be generally recited in the claims.

BRIEF DESCRIPTION OF THE DRAWINGS

A better understanding of the features and advantages of the present invention will be obtained by reference to the following detailed description that sets forth illustrative embodiments by way of example only, in which the principles of the invention are utilized, and the accompanying drawings, of which.

DETAILED DESCRIPTION

Before describing in detail the particular improved display sheet and method, it should be observed that the invention includes, but is not limited to a novel structural combination of conventional components and optical sheets, and not in the particular detailed configurations thereof. Accordingly, the structure and methods for the most part, have been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

Figure 1:
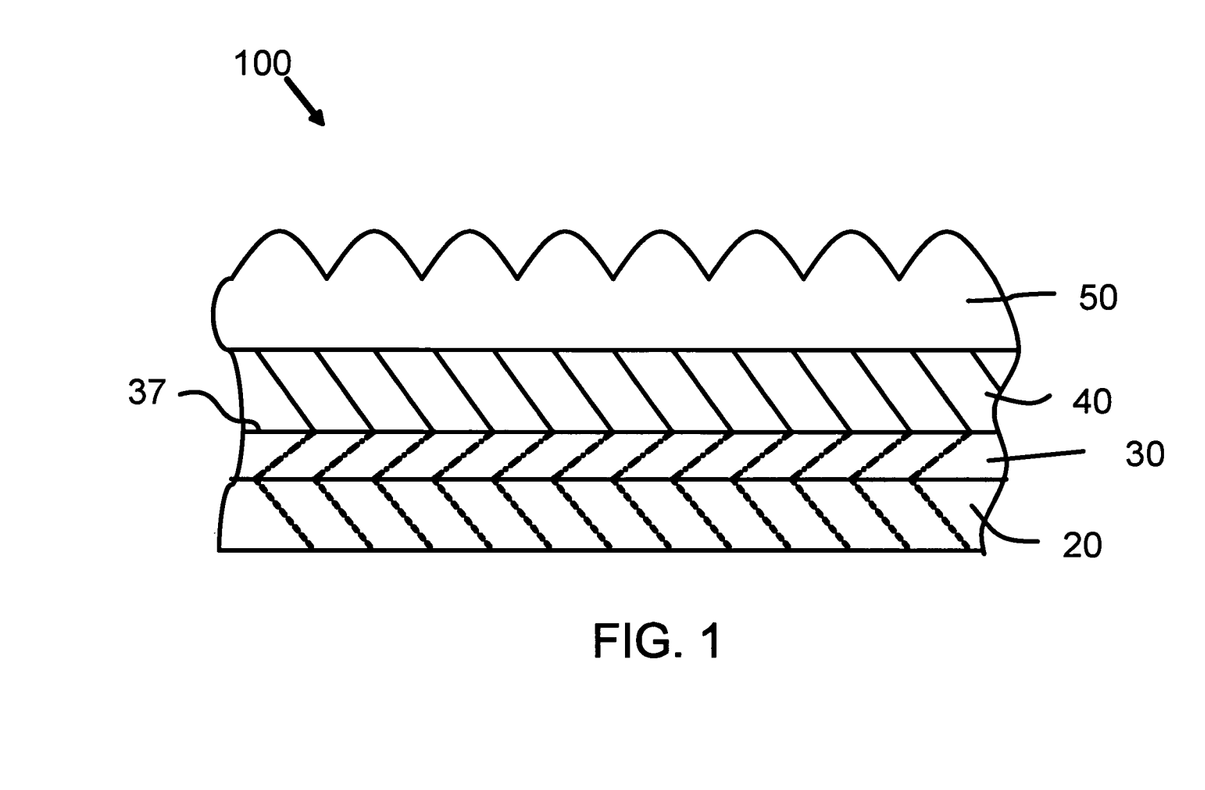
FIG. 1 is an exemplary cross sectional diagram of a lenticular lens sheet overlaying a printed layer, the structure configured to produce a layered image effect.

Referring now to FIG. 1, an exemplary embodiment of a cross section of a lenticular label 100, in accordance with the invention, is depicted. A backing sheet 20, for example, an opaque or clear plastic such as a vinyl laminate layer (alternatively, paper or other materials may be applied), is coated with an adhesive layer 30, such as but not limited to, a glue or resin formulation (alternatively, layer 30 may be a bonding layer created to couple layers 20 and 40 during manufacture through heating or the like). An optional core sheet, for example, an opaque or clear plastic sheet, can be situated between adhesive layer 30 and image layer 40. It is understood that when an optional core sheet is used, a second adhesive layer 37 may be used between the optional core sheet and image layer 40. Image layer 40 can be formed using a variety of materials and methods, such as but not limited to, a curable ink or alternatively a separate image sheet. The lenticular lens top sheet 50 can be formed from a variety of materials, including but not limited to, a clear plastic sheet, a polyvinyl chloride (PVC) sheet, an amorphous polyethylene terephthalate (APET). An optional primer layer (not shown) can be interposed between layers 20-30, 30-40, or 40-50 for better bonding between the layers.

Figure 2:
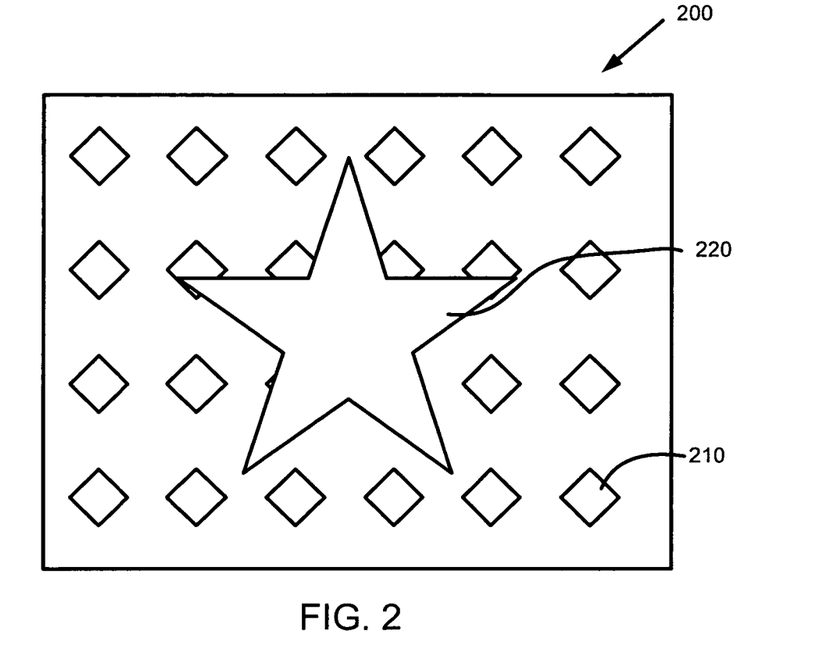
FIG. 2 is an exemplary depiction of a resultant display sheet having a layered image effect.

Referring now to FIG. 2, a display sheet 200 having a background pattern image 210 with a foreground image 220 is depicted. Background pattern image 210 is a moiré pattern having a depth effect when coupled with a light steering optical element such as but not limited to a lenticular lens sheet. Foreground image 220 may be a conventional flat image or may be an interlaced image providing motion, flips, three-dimensional effects, or other effects as may be conventionally created with a lenticular lens screen. Further, foreground image 220 is representative of a focal image or a static image. A focal or static image may be configured to appear as a foreground image, a background image or in the same layer as the moiré pattern image represented in FIG. 2 as background image 210. Patterns may have varying degrees of depth, as described below.

Figure 3:
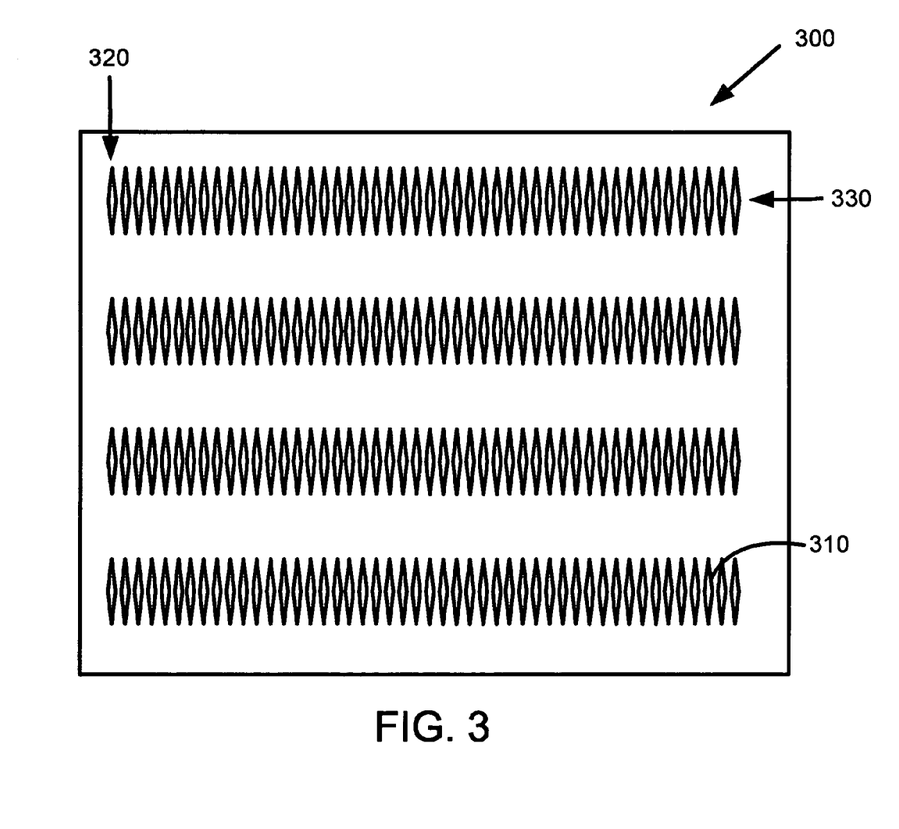
FIG. 3 is an exemplary diagram of a distorted pattern used to produce the layered image effect.

The layered image effect or moiré pattern is created by the combination of a lenticular lens, fisheye lens, barrier screen, or other light steering device having elongated parallel light steering optical elements coupled with distorted pattern elements. For example, an exemplary raw image sheet 300 is depicted in FIG. 3. Raw image sheet 300 has a plurality of distorted pattern elements 310 arranged in a plurality of columns 320 and rows 330. The moiré pattern generation is one application of the science of interferometry (as utilized in the graphic arts' industry), giving optic images the effect of relief, viewed either through transparency or by reflection.

Figure 4:
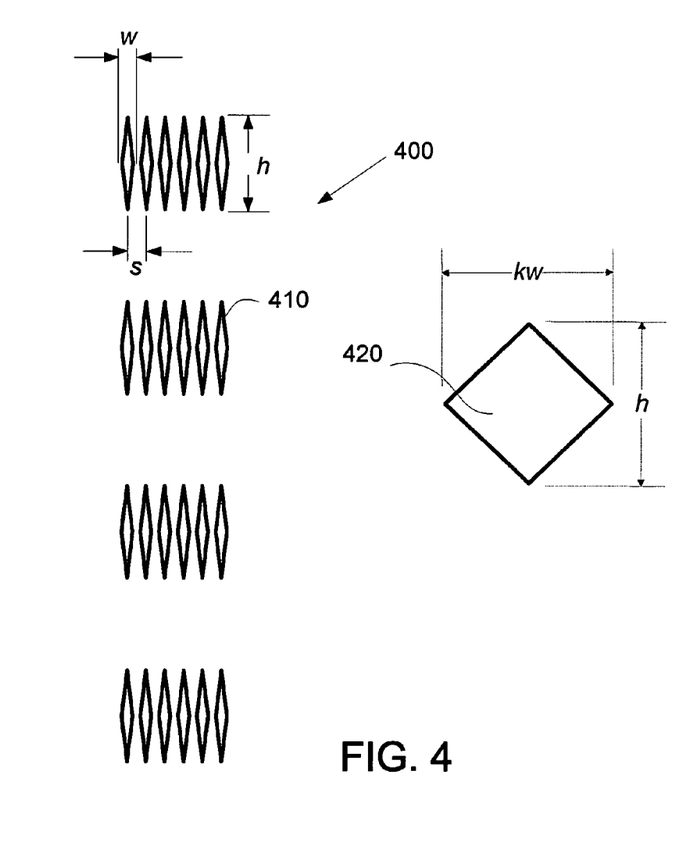
FIG. 4 is an exemplary diagram of a background pattern in accordance with an exemplary embodiment.

Referring now to FIG. 4, an exemplary raw image pattern 400 is depicted. Raw image pattern 400 includes a plurality of distorted pattern elements 410. Each of the distorted pattern elements has a height h which is the height of the resultant pattern element 420 when viewed under a lenticular lens. The width w is distorted from the resultant pattern element 420 width kw, where k is a constant factor typically, but not limited to, on the order of tens or hundreds. Thus, the width of resultant pattern element 420 may be said to be distorted or squeezed in the width direction to have a distorted pattern element 410 width w. In an exemplary embodiment, the width w may be approximately the same width as a single lenticule. The resultant moiré pattern may then be a plurality of pattern elements 420 distributed over a surface but appearing in the background. Referring again to FIG. 2 it may often be desirable to have a foreground image such as image 220 which interrupts the pattern. Further, it is possible to adjust the degree of apparent depth of the pattern by changing the distortion or the aspect ratio of the moiré pattern images. Another way in which the apparent depth of the pattern may be changed is to change the optical characteristics of the light steering optical layer being used. For example, the shape of the lenticules may be changed or the line density of the lenticules may be changed in order to change the apparent depth.

Figure 5:
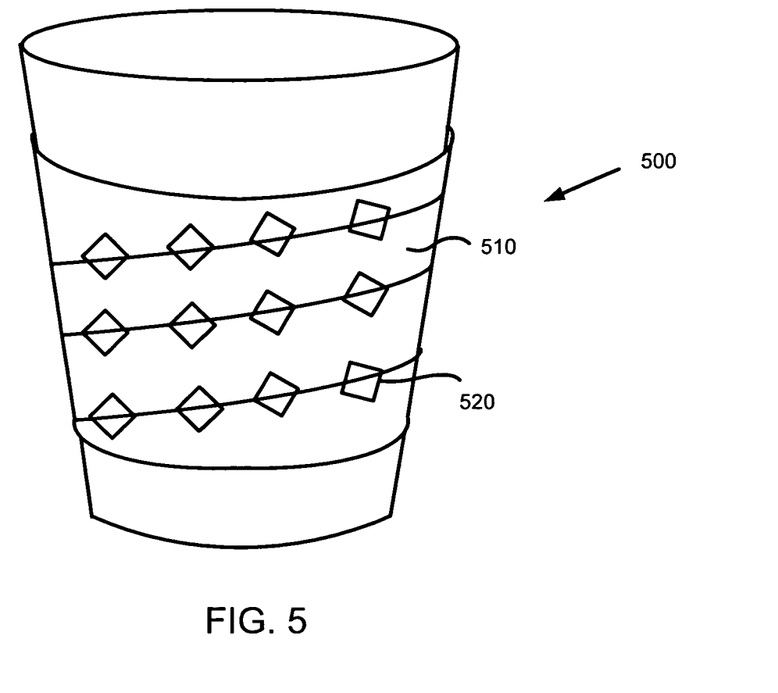
FIG. 5 is an exemplary diagram of a cup labeled with a non preferred configuration of a layered image effect.
Figure 6:
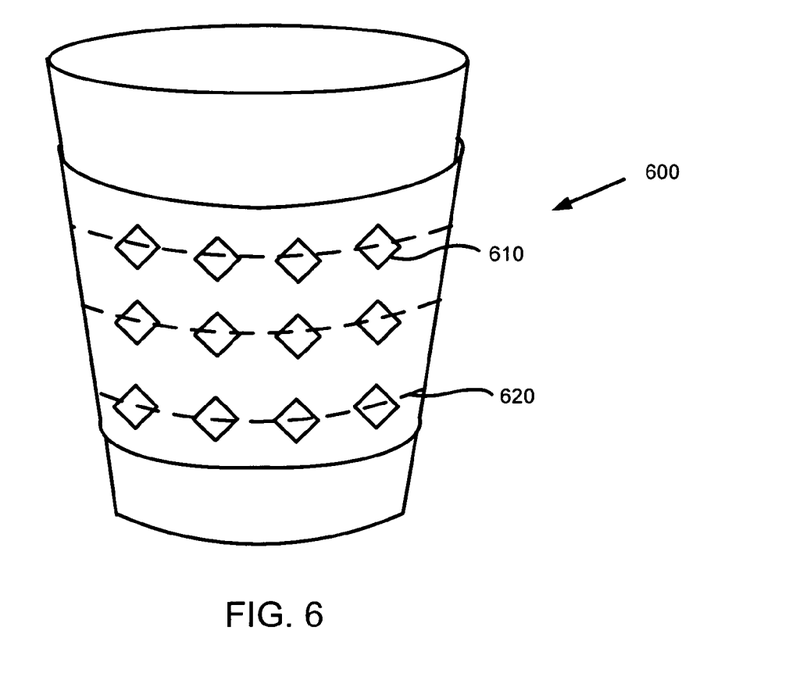
FIG. 6 is an exemplary diagram of a cup labeled with a preferred configuration of a layered image effect in accordance with an exemplary embodiment.

Referring now to FIG. 5, a cup 500 is depicted. Cup 500 includes a label with a moiré pattern coupled thereto. In the case that a moiré pattern was printed on a sheet, the label cut directly from the sheet, and the label applied to the curved surface of the exterior of the frustoconical shaped cup, the moiré pattern 510 would be seen, however the moiré pattern elements would tend to follow a curved line (such as line 520) trajectory that is not parallel to the cup bottom or top. Also, the moiré pattern elements 510 may tend to change orientation around the circumference of the cup. This change in orientation and the curved trajectory of the moiré pattern elements may be undesirable for certain designs. More desirable may be a cup 600, as depicted in FIG. 6 in which the moiré pattern tends to appear parallel to the cup top and bottom (following a circumferential line 620) and the orientation of the moiré pattern elements 610 is the same with respect to one another.

Figure 7:
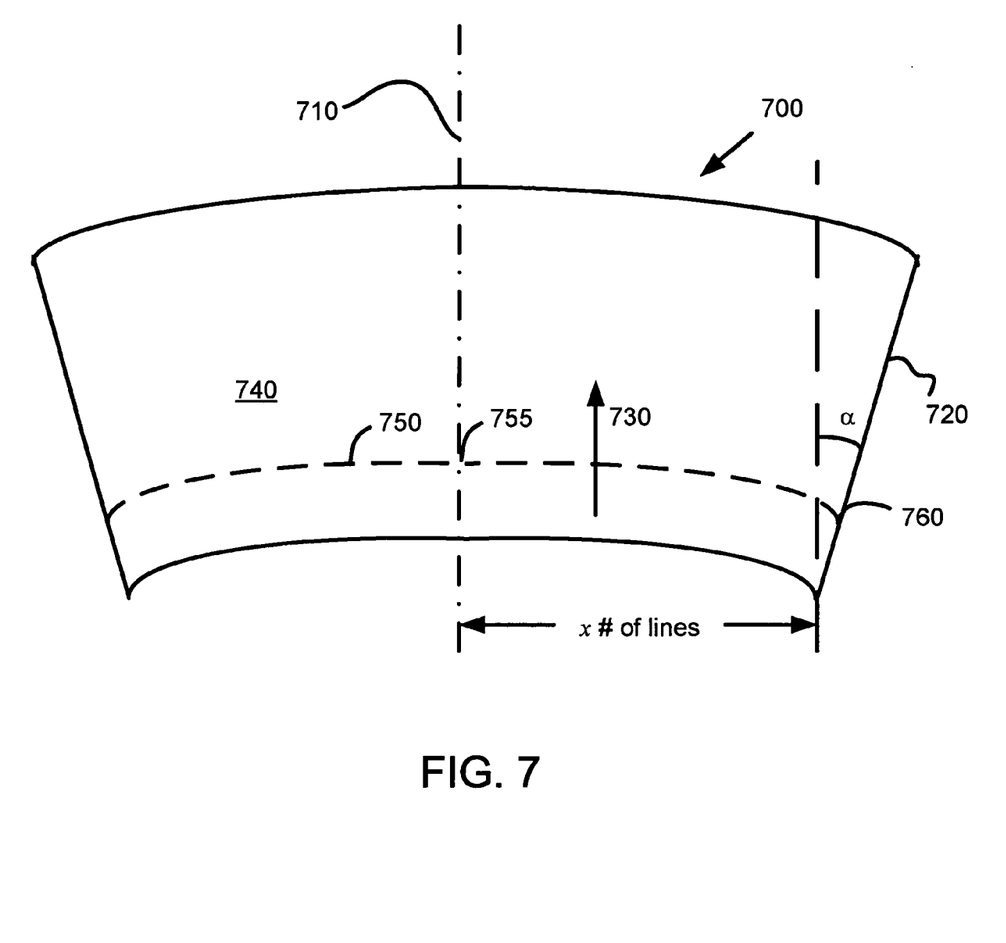
FIG. 7 is an exemplary diagram of a flattened label for a frustoconical shaped container in accordance with an exemplary embodiment.

Depicted in FIG. 7 is an exemplary cut label layout 700 of a label for a frustoconical cup. A centerline 710 is depicted and an angle α defines the angle of the end of the label 720. A number of lines x of lenticular lens elements between the centerline and the end 720 can be determined. This number x will change moving in the direction 730. In an exemplary embodiment, the moiré pattern display sheet may be defined by a surface 740. Because of the application and the geometry of label 700, surface 740 is configured to be curved. A printing may be added that includes, in accordance with an exemplary embodiment, one or more rows of series of visual design elements. The series of visual design elements are distorted in their width. In order to defeat the undesirable curvature effects associated with FIG. 5 and to achieve a more desirable look as depicted in FIG. 6, at least some of the series of visual elements are printed to follow an arc 750 having a sweep angle α associated therewith. Also, at least some of the series of visual elements may be rotated relative to one another along the arc 750 such that at point 755, the elements have a vertical centerline that is approximately parallel with line 710 and at point 760, the elements have an orientation that is approximately parallel with line 720. After the raw pattern is printed on surface 740, a light steering optical layer overlaying layer 740 is applied. The light steering optical layer includes a plurality of parallel optical features which each have a width of approximately w and which change the direction of the light and thereby provide a depth effect of the visual elements to a viewer looking through the light steering optical layer. Such a light steering optical layer may be a lenticular lens sheet or any of a variety of light steering optical elements. In accordance with alternative embodiments, it should be understood that the orientation of the light steering optical layer may be any of a variety of orientations without departing from the scope of the invention. The light steering optical layer may be adhered to the printed layer by any of a variety of methodologies including adhesives, direct printing onto the lenticular lens sheet or directly printing the lenticular lenses onto the printed raw image sheet.

In accordance with an exemplary embodiment, because x increases along direction 730, it may be desirable to have rows at the bottom have the same number of elements as rows at the top, and therefore change the spacing s between the elements in the raw image. In accordance with an alternative embodiment, the number of elements may grow larger in the direction 730, while keeping the spacing s the same across each row of elements. The choice to use one methodology over another may depend on numerous factors including desired appearance, software and printing capabilities, and other characteristics of the design, printing, and viewing processes.

As stated above, it may be desirable to have the x images follow arc 750 in an approximate manner. That is, the following of arc 750 may be done in steps such that a number of distorted images, e.g. 30 images, may follow a straight line. The next 30 images would then be stepped down approximately following arc 750, but aligned in the direction perpendicular to direction 730 on surface 740. The result is a following of the arc in a discretized manner.

Also in accordance with an exemplary embodiment, the angular orientation of the image elements across surface 740 may change. In one exemplary embodiment, the angle of each design element may change by an angle that is proportional to the ratio of the sweep angle to the number of visual elements along the arc. The design is not limited to this methodology of changing angular orientation but may include other angles and also may be reoriented in groups as opposed to individually.

In accordance with exemplary embodiments, a curved label of this type or similar to this may have any of a variety of applications including but not limited to being used as a cup or container label, being used as a cup wrap or sleeve, among others. In one exemplary embodiment, the wrap with the lens may be formed and then placed into a mold whereby a cup or container is then injection molded or blow molded and the label becoming coupled to the cup or container during the molding process. Alternatively, the label may wrap around, either fully or partially, the cup or container and be coupled thereto, or the label may form the wall of the container itself if a suitable material is used for at least one of the label layers.

Figure 8:
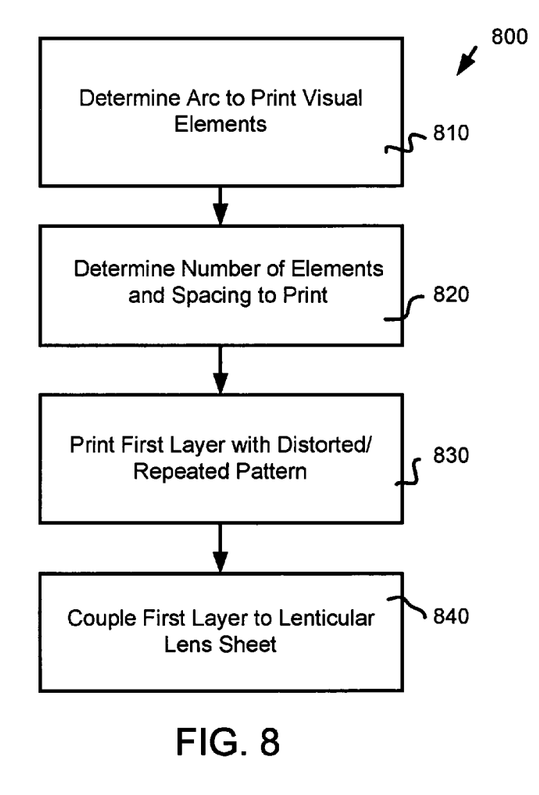
FIG. 8 is an exemplary process diagram for forming a display sheet in accordance with an exemplary embodiment.

Referring now to FIG. 8, a process 800 for forming a moiré pattern display sheet defined by a surface, with the surface being configured to be curved is depicted. A determination of the arc to be followed by the pattern is made (process 810) dependent upon the shape and size of the curved surface. Next a determination of the number of elements in each row and the spacing between the elements is made (process 820). The first layer is then printed with a distorted and series of pattern (process 830). The pattern may comprise a series of visual elements in rows each of the elements having been distorted at least in a first direction (e.g., the width), at least some of the series visual elements are printed to follow an arc having a sweep angle associated therewith, and at least some of the series of visual elements are rotated relative to one another along the arc. Once printed, a lenticular lens sheet or other light steering optical element is coupled to or associated with the printed layer. In accordance with an exemplary embodiment, the visual elements may be distorted in the width to be approximately the same width of one of the parallel optical features of the light steering optical element (e.g., a single lenticule).

In another exemplary embodiment, a determination is made of the orientation of each visual element. The visual elements are then rotated to be printed each by an angle that is proportional to the ratio of the sweep angle to the number of visual elements along the arc. Alternatively other methods and formulations of determining the orientation of the elements may be used without departing from the scope of the invention.

In an exemplary embodiment, a second foreground image may be printed which interrupts a portion of the pattern of the first layer. The second image may be but is not limited to an interlaced image that, when coupled with a lenticular lens sheet may provide the effect of depth or motion.

Figure 9:
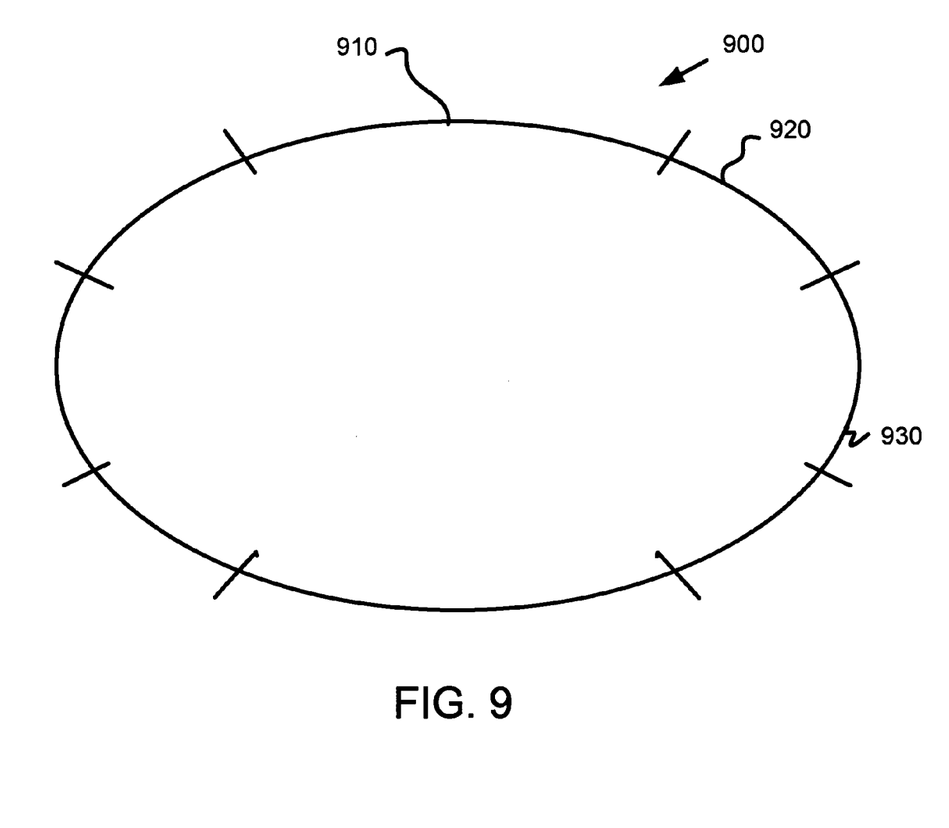
FIG. 9 is an exemplary top view of an elliptical container showing the location of transition regions.

Referring now to FIG. 9, an irregular curved surface such as the elliptical curved surface 900 (shown from above) presents undesirable visual effects on certain portions of the surface if some or more of the techniques described are not applied. The curved surface may be divided up into a number of zones in which each of the number of zones has either different spacing of the pattern elements or has different distortion widths of the pattern elements, than other zones. Alternatively, the spacing or the distortion widths in a particular zone may be gradually changed through the zone. For example, a zone 910 may have pattern spacing s and distortion widths w throughout the zone. A zone may have changing spacing or widths throughout the zone such that near zone 910 the spacing or widths are approximately s or w respectively and near zone 930 the spacing or widths may be less than s or w. For example the spacing may be s-0.03s or the width may be w-0.03w. The factor 0.03 is being used here for illustration purposes only and any applicable factor may be used to generate the desired image characteristics. Other zones may be the same as or different than zones 910, 920, 930. Also, either changes in spacing, changes in widths, or a combination of changing spacing and changing widths may be used without departing from the scope of the invention.

Figure 10:
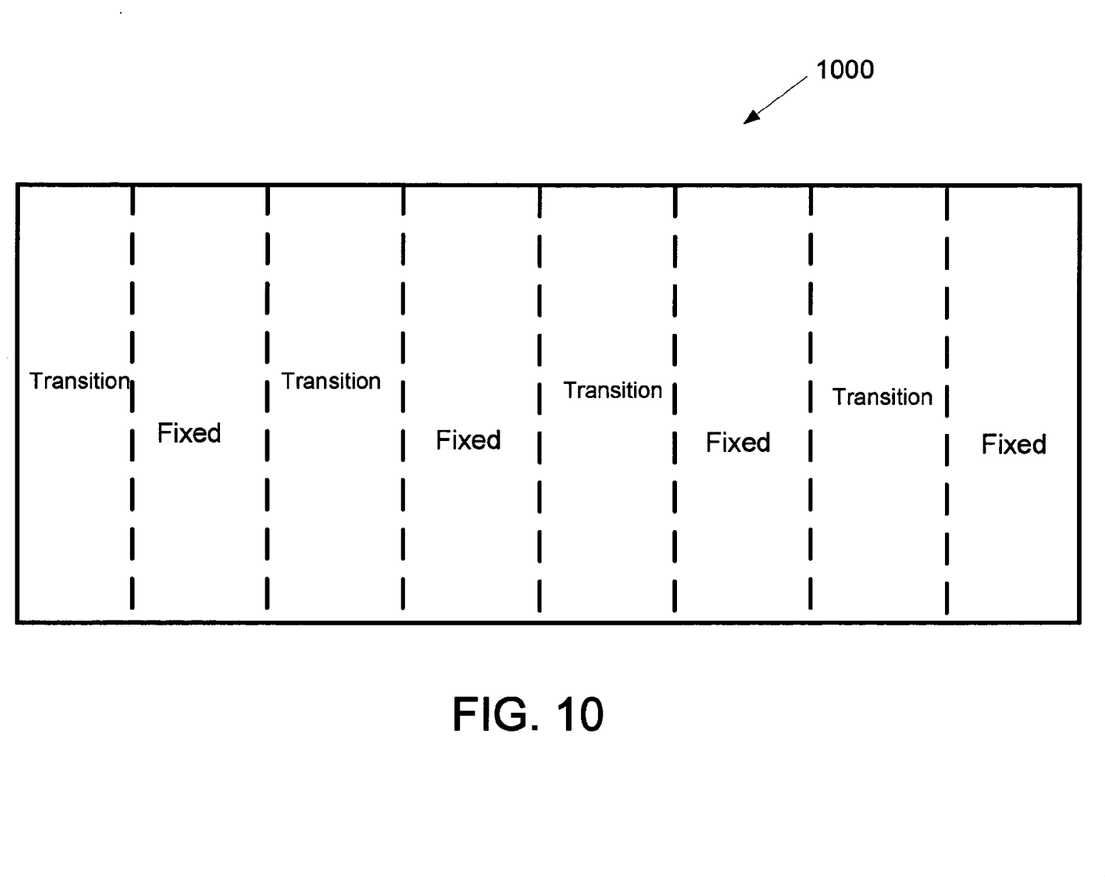
FIG. 10 is an exemplary diagram of the label regions for the label of FIG. 9.
Figure 11:
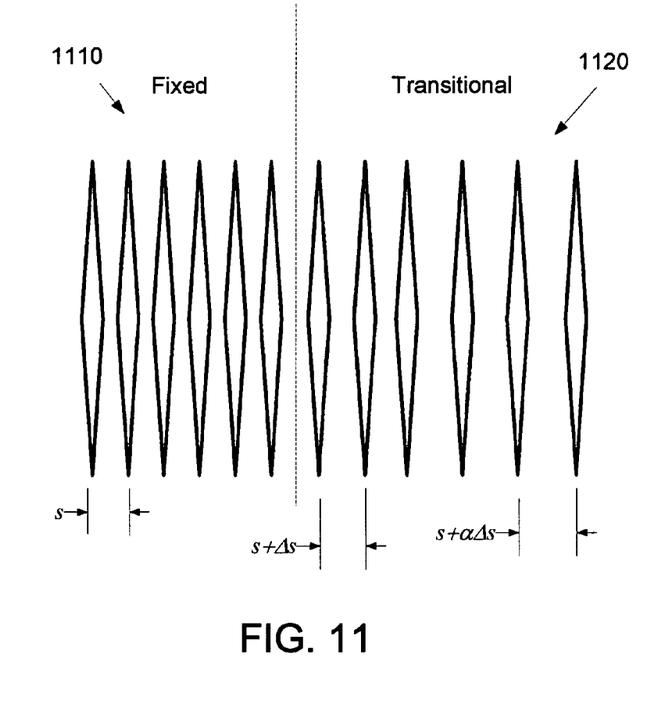
FIG. 11 is an exemplary diagram depicting spacing for the label of FIG. 9.

Referring now to FIG. 10, a flat label 1000 is depicted having a plurality of zones. When printing a label which could be for a curved surface such as curved surface 900 or for any curved surface, the label may be printed flat and then curved to the desired shape. Label 1000 depicts the various zones of a printed label. Also referring to FIG. 11, two zones 1110 and 1120 are depicted. The distorted image elements of zone 1110 are depicted being spaced apart by a distance s. The zone 1120 depicts a graduated change in spacing where image elements are spaced by an amount which either increases or decreases across the zone. Alternatively, the spacing is either more or less than in zone 1110.

Figure 12:
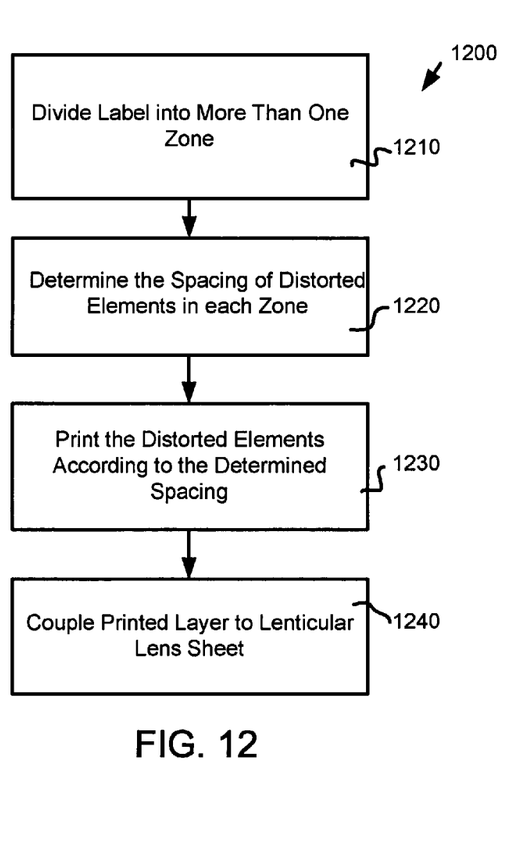
FIG. 12 is another exemplary process diagram for forming a display sheet in accordance with an exemplary embodiment.

Referring now to FIG. 12, a method of a process 1200 of forming a moiré pattern display sheet defined by a surface is depicted. The surface is one which is configured to be curved. Process 1200 comprises dividing a label into at least a first and second region or zone (process 1210). The pattern comprises a series of visual elements in at least one row that have been distorted in at least a first direction. The series of visual elements of the first region are spaced apart by a first spacing and each of the series of visual elements of the first region having a first width. Next a determination is made of the spacing of the series of visual elements of the second region. The spacing of the distorted visual elements are spaced apart by a second spacing different than the first spacing (process 1220). The series of visual elements may have a second width different than the first width. Once the spacing has been determined, a first layer having a pattern is printed according to the determined spacing (process 1230). Once printed, the lenticular lens sheet may be coupled to the printed layer (process 1240).

In accordance with another exemplary embodiment, it may be desirable to change the frequency of the lenticular lens sheet or to change other optical characteristics of the lenticular lens sheet instead of or in combination with changing the spacing and/or the aspect ratio of the distorted pattern elements. Such configurations are a matter of design choice depending on the desired application, the cost, and the desired effect.

While the detailed drawings, specific examples, and particular formulations given described exemplary embodiments, they serve the purpose of illustration only. It should be understood that various alternatives to the embodiments of the invention described maybe employed in practicing the invention. It is intended that the following claims define the scope of the invention and that structures within the scope of these claims and their equivalents be covered thereby. The configurations and processes shown and described may differ depending on the chosen performance characteristics and physical characteristics of the display. For example, the cost and depth desired may differ. The systems shown and described are not limited to the precise details and conditions disclosed. Method steps provided may not be limited to the order in which they are listed but may be ordered any way as to carry out the inventive process without departing from the scope of the invention. Furthermore, other substitutions, modifications, changes and omissions may be made in the design, operating conditions and arrangements of the exemplary embodiments without departing from the scope of the invention as expressed in the appended claims.

What is claimed is:

1. A moiré pattern display sheet defined by a surface, with the surface being configured to be curved, comprising:
    a first layer comprising a printed pattern, the pattern being divided into at least a first and second region, the pattern comprising a series of visual elements in a first row that have been distorted at least in a first direction, the series of visual elements of the first region being spaced apart by a first spacing and each of the series of visual elements of the first region having a first width, the series of visual elements of the second region being at least one of spaced apart by a second spacing different than the first spacing or the series of visual elements having a second width different than the first width; and
    a light steering optical layer overlaying the first layer, the light steering optical layer comprising a plurality of optical features which each have an optical element width and which change a direction of light passing through the optical layer,
    wherein the display sheet provides a depth effect of the visual elements to a viewer looking through the light steering optical layer.

2. The display sheet of claim 1, wherein both the second width and the second spacing are different than the first width and the first spacing respectively.

3. The display sheet of claim 1, wherein the second width is not a fixed width but changes across the second region.

4. The display of claim 1, wherein the second spacing is not a fixed width but changes across the second region.

5. The display sheet of claim 1, wherein the display sheet comprises a second row of visual elements, the first row being parallel to the second row and having the same spacing and widths of the visual elements as the corresponding visual elements of the first row.

6. The display sheet of claim 1, wherein the light steering optical layer comprises a lenticular lens sheet.

7. The display sheet of claim 1, wherein the light steering optical layer comprises a lenticular lens sheet that has been printed onto the first layer.

8. The display sheet of claim 1, wherein the display sheet is used as a label.

9. The display sheet of claim 1, wherein the display sheet is coupled to a container.

10. The display sheet of claim 1, wherein the display sheet is coupled to a cup.

11. The display sheet of claim 1, wherein the display sheet is configured as a wrap for a container.

12. The display sheet of claim 1, wherein the display sheet is configured to be placed in a mold so that a molded product may be coupled thereto during the molding process.

13. The display sheet of claim 1, wherein the display sheet is configured as at least a portion of a sleeve to fit around an object.

14. The display sheet of claim 1, wherein a second image interrupts a portion of the pattern of the first layer.

15. The display sheet of claim 1, wherein the second image is an interlaced image.

16. A method of forming a moiré pattern display sheet defined by a surface, with the surface being configured to be curved, comprising:
    printing a first layer comprising a pattern printed, the pattern being divided into at least a first and second region, the pattern comprising a series of visual elements in a first row that have been distorted at least in a first direction, the series of visual elements of the first region being spaced apart by a first spacing and each of the series of visual elements of the first region having a first width, the series of visual elements of the second region being at least one of spaced apart by a second spacing different than the first spacing or the series of visual elements having a second width different than the first width; and
    providing a light steering optical layer to overlay the first layer, the light steering optical layer comprising a plurality of optical features which each have an optical element width and which change a direction of light passing through the optical layer,
    wherein the display sheet provides a depth effect of the visual elements to a viewer looking through the light steering optical layer.

17. The method of claim 16, wherein both the second width and the second spacing are different than the first width and the first spacing respectively.

18. The method of claim 16, wherein the second width is not a fixed width but changes across the second region.

19. The method of claim 16, wherein the second spacing is not a fixed width but changes across the second region.

20. The method of claim 16, wherein the display sheet comprises a second row of visual elements, the first row being parallel to the second row and having the same spacing and widths of the visual elements as the corresponding visual elements of the first row.

21. The method of claim 16, wherein the light steering optical layer comprises a lenticular lens sheet.

22. The method of claim 16, wherein the light steering optical layer comprises a lenticular lens sheet that has been printed onto the first layer.

23. The method of claim 16, wherein the display sheet is used as a label.

24. The method of claim 16, wherein the display sheet is coupled to a container.

25. The method of claim 16, wherein the display sheet is coupled to a cup.

26. The method of claim 16, wherein the display sheet is configured as a wrap for a container.

27. The method of claim 16, wherein the display sheet is configured to be placed in a mold so that a molded product may be coupled thereto during the molding process.

28. The method of claim 16, wherein the display sheet is configured as at least a portion of a sleeve to fit around an object.

29. The method of claim 16, wherein a second image interrupts a portion of the pattern of the first layer.

30. The method of claim 29, wherein the second image is an interlaced image.

31. A display sheet for displaying a moiré pattern on a curved surface, the display sheet comprising:
a first layer comprising a printed pattern, the pattern comprising a series of distorted pattern elements in a first row, each distorted pattern element having a first dimension and a second dimension, at least some of the series of distorted pattern elements being printed to approximately follow an arc having a sweep angle associated therewith; and
a light steering optical layer overlaying the first layer, the light steering optical layer comprising a plurality of optical features, each feature being configured to shift a direction of a path of travel of light passing through the feature,
wherein the pattern is viewable through the light steering optical layer as a series of resultant pattern elements, each of the resultant pattern elements having a first resultant dimension, the first resultant dimension of the resultant pattern element being equal to the first dimension of the distorted pattern element multiplied by a constant factor, and
wherein the display sheet provides a depth effect of the pattern to a viewer looking through the light steering optical layer.

32. The display sheet of claim 31, wherein each of the resultant pattern elements has a second resultant dimension, the second resultant dimension of the resultant pattern element being equal to the second dimension of the distorted pattern element multiplied by a constant factor.

33. The display sheet of claim 31, wherein a length of the first dimension of each distorted pattern element is approximately equal to a width of one of the plurality of optical features.

34. The display sheet of claim 31, wherein the pattern comprises a second row of distorted elements, the first row being parallel to the second row.

35. The display sheet of claim 34, wherein the first row is longer than the second row, and the first row contains a number of printed distorted elements equal to a number of printed distorted elements in the second row.

36. The display sheet of claim 34, wherein the first row is longer than the second row, and the first row contains a number of printed distorted elements larger than a number of printed distorted elements in the second row.

37. The display sheet of claim 31, wherein the printed distorted pattern elements are each rotated by an angle that is proportional to a ratio of the sweep angle to a number of printed distorted pattern elements along the arc.

38. The display sheet of claim 31, wherein the light steering optical layer comprises a lenticular lens sheet.

39. The display sheet of claim 31, wherein the light steering optical layer comprises a lens sheet, wherein a first surface of the lens sheet comprises the plurality of optical features, and wherein the first layer is printed on a second surface of the lens opposite the first surface.

40. The display sheet of claim 31, wherein the light steering optical layer comprises a lens sheet, wherein a first surface of the lens sheet comprises the plurality of optical features, and wherein the first layer is printed on a separate substrate and bonded to a second surface of the lens sheet opposite the first surface.

41. The display sheet of claim 31, wherein the display sheet is used as a label.

42. The display sheet of claim 31, wherein the display sheet is coupled to a container.

43. The display sheet of claim 31, wherein the display sheet is coupled to a cup.

44. The display sheet of claim 31, wherein the display sheet is configured as a wrap for a container.

45. The display sheet of claim 31, wherein the display sheet is configured to be placed in a mold so that a molded product may be coupled thereto during the molding process.

46. The display sheet of claim 31, wherein the display sheet is configured as at least a portion of a sleeve to fit around an object.

47. The display sheet of claim 31, wherein a second image interrupts a portion of the pattern of the first layer.

48. The display sheet of claim 47, wherein the second image is an interlaced image.

49. The display sheet of claim 31, wherein at least some of the series of distorted pattern elements are rotated relative to one another along the arc.

50. The display sheet of claim 1, wherein the light steering optical layer comprises a lens sheet, wherein a first surface of the lens sheet comprises the plurality of optical features, and wherein the first layer is printed directly on a second surface of the lens sheet opposite the first surface.

51. The display sheet of claim 1, wherein the light steering optical layer comprises a lens sheet, wherein a first surface of the lens sheet comprises the plurality of optical features, and wherein the first layer is printed on a separate substrate and bonded to a second surface of the lens sheet opposite the first surface.

52. The method of claim 16, wherein providing the light steering optical layer comprises providing a lens sheet having a first surface comprising the plurality of optical features, and wherein printing the first layer comprises printing the pattern on a second surface of the lens sheet opposite the first surface.

53. The method of claim 16, wherein providing the light steering optical layer comprises providing a lens sheet having a first surface comprising the plurality of optical features, and wherein printing the first layer comprises printing the pattern on a separate substrate, the method further comprising bonding the separate substrate printed with the pattern to a second surface of the lens sheet opposite the first surface.

\* \* \* \* \*